(12) United States Patent  
Takemoto

(10) Patent No.: US 8,103,702 B2  
(45) Date of Patent: Jan. 24, 2012

(54) INFORMATION PROCESSING DEVICE, ELECTRONIC MANUAL MANAGING METHOD, AND ELECTRONIC MANUAL MANAGING PROGRAM

(75) Inventor: Ryo Takemoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 410 days.

(21) Appl. No.: 12/197,715

(22) Filed: Aug. 25, 2008

(65) Prior Publication Data

US 2009/0063573 A1    Mar. 5, 2009

(30) Foreign Application Priority Data

Aug. 28, 2007 (JP) ................................. 2007-221410  
Jun. 27, 2008 (JP) ................................. 2008-169493

(51) Int. Cl.  
*G06F 17/30* (2006.01)

(52) U.S. Cl. ........................ 707/803; 715/231

(58) Field of Classification Search .................. None  
See application file for complete search history.

(56) References Cited

U.S. PATENT DOCUMENTS

| | | | | |
|---|---|---|---|---|
| 5,963,966 | A * | 10/1999 | Mitchell et al. | 715/236 |
| 6,769,096 | B1 * | 7/2004 | Kuppusamy et al. | 715/234 |
| 7,424,669 | B2 * | 9/2008 | Bhogal et al. | 715/230 |
| 7,724,249 | B1 * | 5/2010 | Horikawa et al. | 345/418 |
| 2005/0010865 | A1 * | 1/2005 | Kuppusamy et al. | 715/512 |
| 2006/0206462 | A1 * | 9/2006 | Barber | 707/3 |
| 2007/0033208 | A1 * | 2/2007 | Talluri | 707/100 |
| 2008/0046840 | A1 * | 2/2008 | Melton et al. | 715/825 |
| 2008/0126305 | A1 * | 5/2008 | Sayeler et al. | 707/3 |

FOREIGN PATENT DOCUMENTS

| | | |
|---|---|---|
| JP | 2003-256216 | 9/2003 |
| JP | 2004-21576 | 1/2004 |
| JP | 2006-338517 | 12/2006 |
| JP | 2007-140851 | 6/2007 |
| JP | 2008-66887 | 3/2008 |

* cited by examiner

*Primary Examiner* — Debbie Le  
(74) *Attorney, Agent, or Firm* — Oblon, Spivak, McClelland, Maier & Neustadt, L.L.P.

(57) ABSTRACT

In an information processing device which is capable of adding a new program, a managing unit is configured to manage bibliographic information of each of electronic manuals associated with respective programs installed in the information processing device. A registering unit is configured to register, in response to addition of a new program, bibliographic information of an electronic manual associated with the new program, into the managing unit. A display data generating unit is configured to generate display data indicating a list of the electronic manuals, based on the bibliographic information managed by the managing unit. A displaying unit is configured display the list of the electronic manuals on a display device based on the display data.

19 Claims, 15 Drawing Sheets

| SEPARATE VOLUME TITLE | URL | STORED FILE NAME | HTML FILE PATH | DISPLAY PRIORITY | DATE OF ADDITION | OWNER NAME |
|---|---|---|---|---|---|---|
| COPY | manual/copy/ | copymanual.jar | manual/copy/index.html | 1 | 2007/5/1 | copy-appli |
| SCANNER | manual/scanner/ | scannermanual.jar | manual/scanner/index.html | 2 | 2007/5/1 | scanner-appli |

612

| PAGE TITLE | URL | STORED FILE NAME | HTML FILE PATH | SEPARATE VOLUME TITLE | DISPLAY PRIORITY | DATE OF ADDITION | OWNER NAME |
|---|---|---|---|---|---|---|---|
| COPY | manual/copy/first | copymanual.jar | manual/copy/001.html | COPY | 1 | 2007/5/1 | copy-appli |
| INTENSIVE-COPY | manual/copy/2in1 | copymanual.jar | manual/copy/002.html | COPY | 2 | 2007/5/1 | copy-appli |
| STAPLE | manual/copy/staple | copymanual.jar | manual/copy/003.html | COPY | 3 | 2007/5/1 | copy-appli |
| SCANNER | manual/copy/first | scannermanual.jar | manual/scanner/001.html | SCANNER | 1 | 2007/5/1 | scanner-appli |
| DF | manual/copy/df | scannermanual.jar | manual/scanner/002.html | SCANNER | 2 | 2007/5/1 | scanner-appli |

| SEPARATE VOLUME TITLE | URL | STORED FILE NAME | HTML FILE PATH | DISPLAY PRIORITY | DATE OF ADDITION | OWNER NAME |
|---|---|---|---|---|---|---|
| COPY | manual/copy/ | copymanual.jar | manual/copy/index.html | 1 | 2007/5/1 | copy-appli |
| SCANNER | manual/scanner/ | scannermanual.jar | manual/scanner/index.html | 2 | 2007/5/1 | scanner-appli |
| FUNCTION α | manual/alfa/ | alfamanual.jar | manual/alfa/index.html | 10 | 2007/6/1 | alfa-appli |

612

| PAGE TITLE | URL | STORED FILE NAME | HTML FILE PATH | SEPARATE VOLUME TITLE | DISPLAY PRIORITY | DATE OF ADDITION | OWNER NAME |
|---|---|---|---|---|---|---|---|
| COPY | manual/copy/first | copymanual.jar | manual/copy/001.html | COPY | 1 | 2007/5/1 | copy-appli |
| INTENSIVE-COPY | manual/copy/2in1 | copymanual.jar | manual/copy/002.html | COPY | 2 | 2007/5/1 | copy-appli |
| STAPLE | manual/copy/staple | copymanual.jar | manual/copy/003.html | COPY | 3 | 2007/5/1 | copy-appli |
| SCANNER | manual/copy/first | scannermanual.jar | manual/scanner/001.html | SCANNER | 1 | 2007/5/1 | scanner-appli |
| DF | manual/copy/df | scannermanual.jar | manual/scanner/002.html | SCANNER | 2 | 2007/5/1 | scanner-appli |
| FUNCTION α | manual/alfa/first | alfamanual.jar | manual/alfa/001.html | FUNCTION α | 1 | 2007/6/1 | alfa-appli |
| HOW TO USE | manual/alfa/howto | alfamanual.jar | manual/alfa/002.html | FUNCTION α | 2 | 2007/6/1 | alfa-appli |

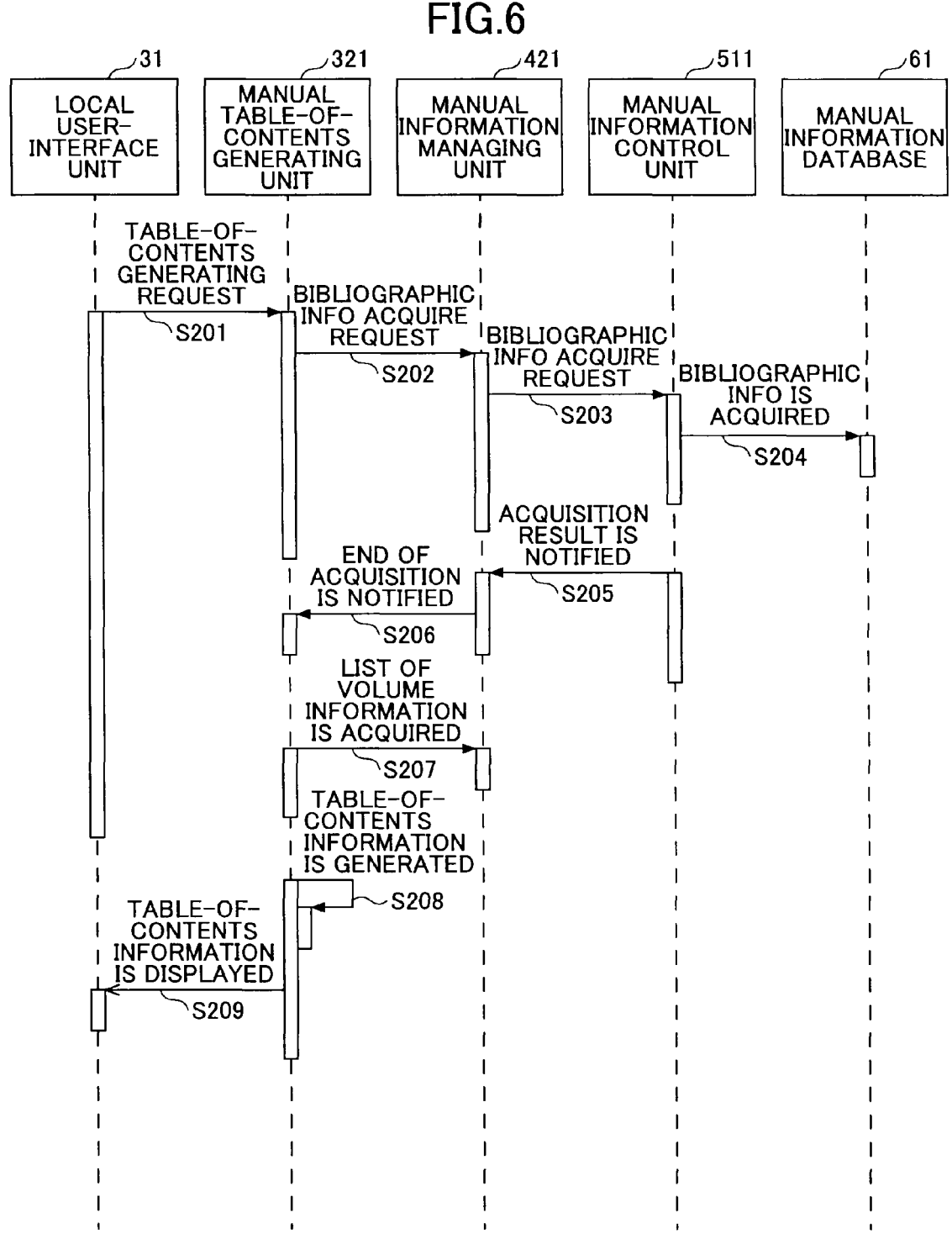

INFORMATION PROCESSING DEVICE, ELECTRONIC MANUAL MANAGING METHOD, AND ELECTRONIC MANUAL MANAGING PROGRAM

BACKGROUND OF THE INVENTION

1. Field of the Invention

This invention relates to an information processing device which is capable of adding a new program, an electronic manual managing method, and an electronic manual managing program.

2. Description of the Related Art

In recent years, many applications are mounted in an image processing device, such as a printer, a copier or a multi-function peripheral. In order to facilitate the user's understanding of the function and operating method of such applications, mounting the electronic manual content in the image processing device and enabling the user to view the electronic manual is effective.

On the other hand, conventionally, installation and uninstallation of an application or plug-in in an image processing device is possible, and the functions of the image processing device after shipment can be enhanced according to the user selection.

However, the contents of list information (table-of-contents information) of the electronic manual to be displayed on the device are produced beforehand and fixed (or static) as disclosed in Japanese Laid-Open Patent Application No. 2006-338517. Therefore, if an application is newly installed in the device, the fixed table of contents is displayed and an electronic manual of the newly installed application cannot be viewed.

SUMMARY OF THE INVENTION

In one aspect of the invention, the present disclosure provides an improved information processing device in which the above-described problems are eliminated.

In another aspect of the invention, the present disclosure provides an information processing device which is able to help the user easily view and handle an electronic manual of each installed program.

In an embodiment of the invention which solves or reduces one or more of the above-mentioned problems, the present disclosure provides an information processing device which is capable of adding a new program, the information processing device comprising: a managing unit configured to manage bibliographic information of each of electronic manuals associated with respective programs installed in the information processing device; a registering unit configured to register, in response to addition of a new program, bibliographic information of an electronic manual associated with the new program, into the managing unit; a display data generating unit configured to generate display data indicating a list of the electronic manuals, based on the bibliographic information managed by the managing unit; and a displaying unit configured to display the list of the electronic manuals on a display device based on the display data.

The above-mentioned information processing device may be arranged so that the displaying unit is configured to display a list of titles of the electronic manuals contained in the bibliographic information.

The above-mentioned information processing device may be arranged so that the displaying unit is configured to acquire, in response to selection of an electronic manual among the electronic manuals in the list, display data of the selected electronic manual based on position information of the display data contained in the bibliographic information, so that the display data is displayed.

The above-mentioned information processing device may be arranged to further comprise a deleting unit configured to delete, in response to deletion of a program, bibliographic information of an electronic manual, associated with the program being deleted, in the managing unit.

The above-mentioned information processing device may be arranged so that, in response to a replacing request of an existing electronic manual associated with a program, the deleting unit is configured to delete bibliographic information of the existing electronic manual, and the registering unit is configured to register bibliographic information of a new electronic manual.

The above-mentioned information processing device may be arranged so that the managing unit configured to manage the bibliographic information according to a hierarchic structure of the contents of the electronic manuals, and the display data generating unit is configured to generate the display data based on bibliographic information of a predetermined hierarchy in the hierarchic structure.

The above-mentioned information processing device may be arranged so that the bibliographic information contains a display priority indicating a sequence of displaying the electronic manuals in the list, and the display data generating unit is configured to generate the display data based on the display priority.

The above-mentioned information processing device may be arranged so that the bibliographic information contains a date of addition indicating a date the bibliographic information is registered in the managing unit, and the display data generating unit is configured to determine a sequence of displaying the electronic manuals in the list based on the date of addition.

The above-mentioned information processing device may be arranged so that the display data generating unit is configured to determine a sequence of displaying the electronic manuals in the list based on a use frequency of each of the respective programs according to log information which is recorded each time a corresponding one of the programs is used.

Moreover, in an embodiment of the invention which solves or reduces one or more of the above-mentioned problems, the present disclosure provides an electronic manual managing method for use in an information processing device which is capable of adding a new program, the information processing device including a managing unit configured to manage bibliographic information of each of electronic manuals associated with respective programs installed in the information processing device, the electronic manual managing method comprising: a registering step of registering, in response to addition of a new program, bibliographic information of an electronic manual associated with the new program, into the managing unit; a display data generating step of generating display data indicating a list of the electronic manuals, based on the bibliographic information managed by the managing unit; and a displaying step of displaying the list of the electric manuals on a display device based on the display data.

Moreover, in an embodiment of the invention which solves or reduces one or more of the above-mentioned problems, the present disclosure provides a computer-readable recording medium storing a computer-readable program which, when executed by a computer, causes the computer to perform the above-mentioned electronic manual managing method.

The embodiments of the information processing device, the electronic manual managing method, and the electronic manual managing program according to the invention can help the user easily view and handle the electronic manual of each installed program.

Other objects, features and advantages of the present invention will become more apparent from the following detailed description when read in conjunction with the accompanying drawings.

BRIEF DESCRIPTION OF THE DRAWINGS

FIG. 3 is a diagram showing the composition of a manual information database.

FIG. 5 is a diagram showing the state of the manual information database after installation of the function α plug-in.

FIG. 6 is a sequence diagram for explaining the procedure of the information processing device in the first embodiment when the contents information of the electronic manual is displayed.

DETAILED DESCRIPTION OF THE PREFERRED EMBODIMENTS

A description will be given of embodiments of the invention with reference to the accompanying drawings.

The composition of an image forming device will be described as an example of the information processing device according to the invention.

Figure 1:
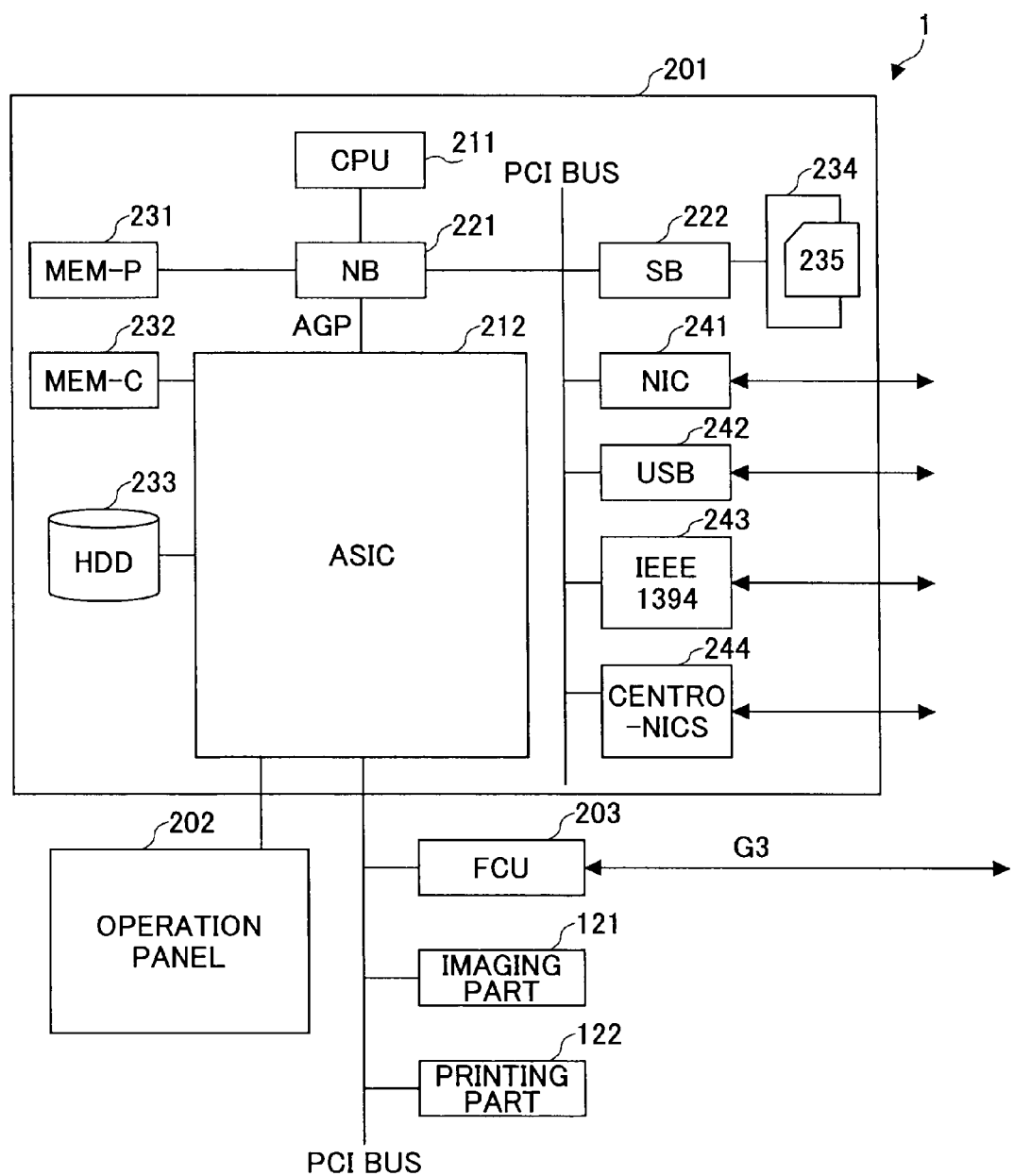
FIG. 1 is a block diagram showing the hardware composition of an image forming device in an embodiment of the invention.

FIG. 1 shows the hardware composition of an image forming device in an embodiment of the invention. The hardware composition of a multi-function peripheral 1 is shown in FIG. 1 as a typical example of an image forming device.

The hardware of the multi-function peripheral 1 include a controller 201, an operation panel 202, a facsimile control unit (FCU) 203, an imaging part 121, and a printing part 122.

The controller 201 includes a CPU 211, an ASIC 212, a NB 221, a SB 222, a MEM-P 231, a MEM-C 232, a HDD (hard disk drive) 233, a memory card slot 234, a NIC (network interface controller) 241, a USB device 242, an IEEE1394 device 243, and a Centronics device 244.

The CPU 211 is the IC for various information processing. The ASIC 212 is the IC for various image processing. The NB 221 is the north bridge of the controller 201. The SB 222 is the south bridge of the controller 201. The MEM-P 231 is the system memory of the multi-function peripheral 1. The MEM-C 232 is the local memory of the multi-function peripheral 1. The HDD 233 is the storage device of the multi-function peripheral 1. The memory card slot 234 is a slot for setting a memory card 235. The NIC 241 is a controller for network communications by using a MAC address. The USB device 242 is a device for providing the connection interface in conformity with the USB specifications. The IEEE1394 device 243 is a device for providing the connection interface in conformity with the IEEE1394 specifications. The Centronics device 244 is a device for providing the connection interface in conformity with the Centronics specifications.

The operation panel 202 is the hardware (operation device) for an operator to give an input to the multi-function peripheral 1, while it is the hardware (display device) for an operator to obtain an output from the multi-function peripheral 1.

Figure 2:
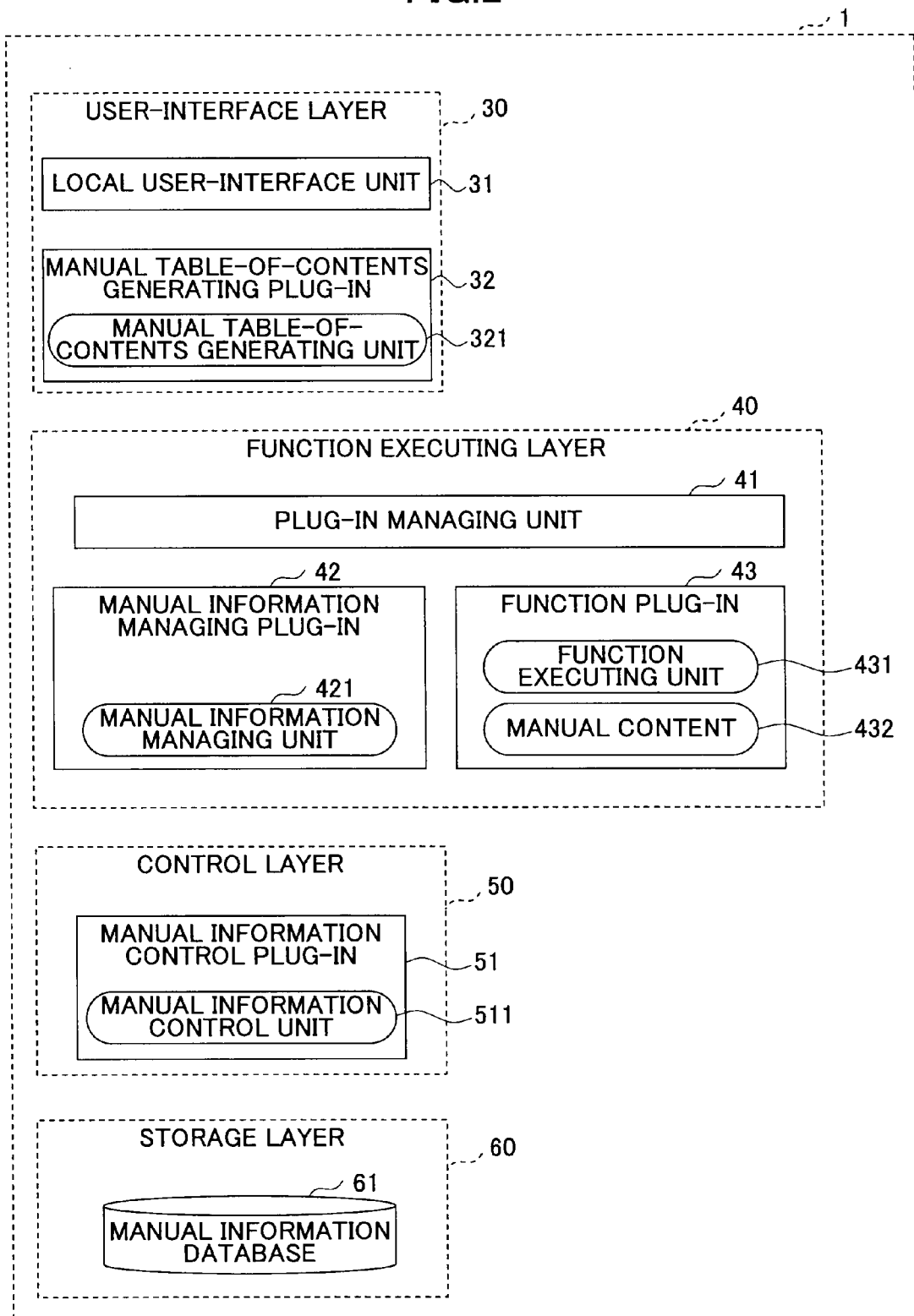
FIG. 2 is a block diagram showing the function composition of an image forming device in a first embodiment of the invention.

FIG. 2 shows the function composition of the image forming device in the first embodiment.

As shown in FIG. 2, the functions of the multi-function peripheral 1 are grouped into a user-interface layer 30, a function executing layer 40, a control layer 50, and a storage layer 60.

The user-interface (UI) layer 30 includes a local UI unit 31 and a manual table-of-contents generating plug-in 32.

The local UI unit 31 controls the displaying of the operation screen, an electronic manual screen, etc. of the operation panel 202 of the multi-function peripheral 1. The manual table-of-contents generating plug-in 32 is a plug-in having a manual table-of-contents generating unit 321. The manual table-of-contents generating unit 321 dynamically generates the contents for displaying the list information (table-of-contents information) of the electronic manuals of plug-in modules having electronic manuals among the plug-in modules installed in the multi-function peripheral 1.

In this embodiment, "plug-in" means a program module which can be independently installed (added) or uninstalled (deleted) in the multi-function peripheral 1 and provides a predetermined function. There are some plug-in modules which constitute a single application (a service viewed from the user), and other plug-in modules which constitute a single application in combination of two or more plug-in modules. In FIG. 2, all the elements labeled "XXX plug-in" are equivalent to plug-in.

The function executing layer 40 includes a plug-in managing unit 41, a manual information managing plug-in 42, and a function plug-in 43.

The plug-in managing unit 41 manages the static attribute information list of the plug-in modules installed in the multi-function peripheral 1. The static attribute information is equivalent to the path of the location where the plug-in is installed, the file name of the substance of the plug-in, etc.

The manual information managing plug-in 42 is a plug-in having a manual information managing unit 421. The manual information managing unit 421 controls a registration process, a reference process, an update process, a deletion process, etc. of a manual information database 61 (which will be mentioned later) with respect to the attribute information (bibliographic information) of the electronic manuals of the plug-in modules.

The function plug-in 43 is a plug-in providing any of various functions for the multi-function peripheral 1. In FIG. 2, the function plug-in 43 is indicated as a rectangular block. Alternatively, a certain function plug-in 43 may provide the function of reading an image using the scanner and another function plug-in 43 may provide the function of printing an image using the printer. The substance of each function plug-in may be provided and installed for every function.

Each function plug-in 43 has a function executing unit 431 and a manual content 432. The function executing unit 431 performs processing for realizing the function of the function plug-in 43 concerned. The manual content 432 is substantial information (display data) of the electronic manual of the function plug-in 43 concerned. In this embodiment, the function plug-in 43 is equivalent to a plug-in having an electronic manual.

The control layer 50 includes a manual information control plug-in 51. The manual information control plug-in 51 is a plug-in having a manual information control unit 511. The manual information control unit 511 provides the function of accessing the manual information database 61 which will be described below.

The storage layer 60 includes a manual information database 61. The manual information database 61 manages the list of the bibliographic information of the electronic manual of each function plug-in.

FIG. 3 shows the composition of a manual information database. As shown in FIG. 3, the manual information database includes a separate volume information table 611 and a page information table 612.

The separate volume information table 611 is a table which is provided to manage the bibliographic information of each electronic manual as a separate volume. In this embodiment, the electronic manual of each of the function plug-in modules 43 is treated as a separate volume. Therefore, the separate volume information table 611 is a table which is provided to manage the bibliographic information of the electronic manual of each function plug-in 43.

In the separate volume information table 611, bibliographic information ("separate volume information"), including separate volume title, URL (uniform resource locator), stored file name, HTML (hypertext markup language) file path, display priority, date of addition, and owner name, is managed for every separate volume. The separate volume title denotes the title of a separate volume. The URL denotes URL of the content of a separate volume. The stored file name denotes the file name with which the content of a separate volume is stored. The HTML file path denotes the pathname of an HTML file which displays the index of a separate volume. The display priority denotes the priority of the displaying sequence when displaying the list of separate volumes. The date of addition denotes the date on which the separate volume information was added to the separate volume information table 611 (registration). The owner name denotes the owner of a separate volume, i.e., the identifier of the function plug-in 43 corresponding to the separate volume.

For example, "copy-appli" is the identifier of a copy application plug-in. "scanner-appli" is the identifier of a scanner application plug-in.

The page information table 612 is a table which is provided to manage the bibliographic information of the electronic manual of a chapter (text) within the same volume. In this embodiment, the bibliographic information is managed for every hierarchy in accordance with the hierarchic structure of the contents of the electronic manuals on the basis of volume and on the basis of chapter.

The page information table 612 manages the bibliographic information ("page information"), including page title, URL, stored file name, HTML file path, separate volume title, display priority, date of addition, and owner name for every chapter (text).

The page title denotes the title of a chapter. The URL denotes URL of the contents of a chapter. The stored file name denotes the file name with which the contents of a chapter are stored. The HTML file path denotes the pathname of an HTML file which displays the index of a chapter. The display priority denotes the priority of the displaying sequence when displaying the list of chapters within a volume. The date of addition denotes the date on which the page information was added to the page information table 612 (registration). The owner name denotes the identifier of the owner (the function plug-in 43) of a chapter.

The separate volume information table 611 and the page information table 612 are stored in the storage areas of the HDD 233, for example.

Next, the procedure of the information processing device (the multi-function peripheral 1) in a first embodiment of the invention will be explained.

Figure 4:
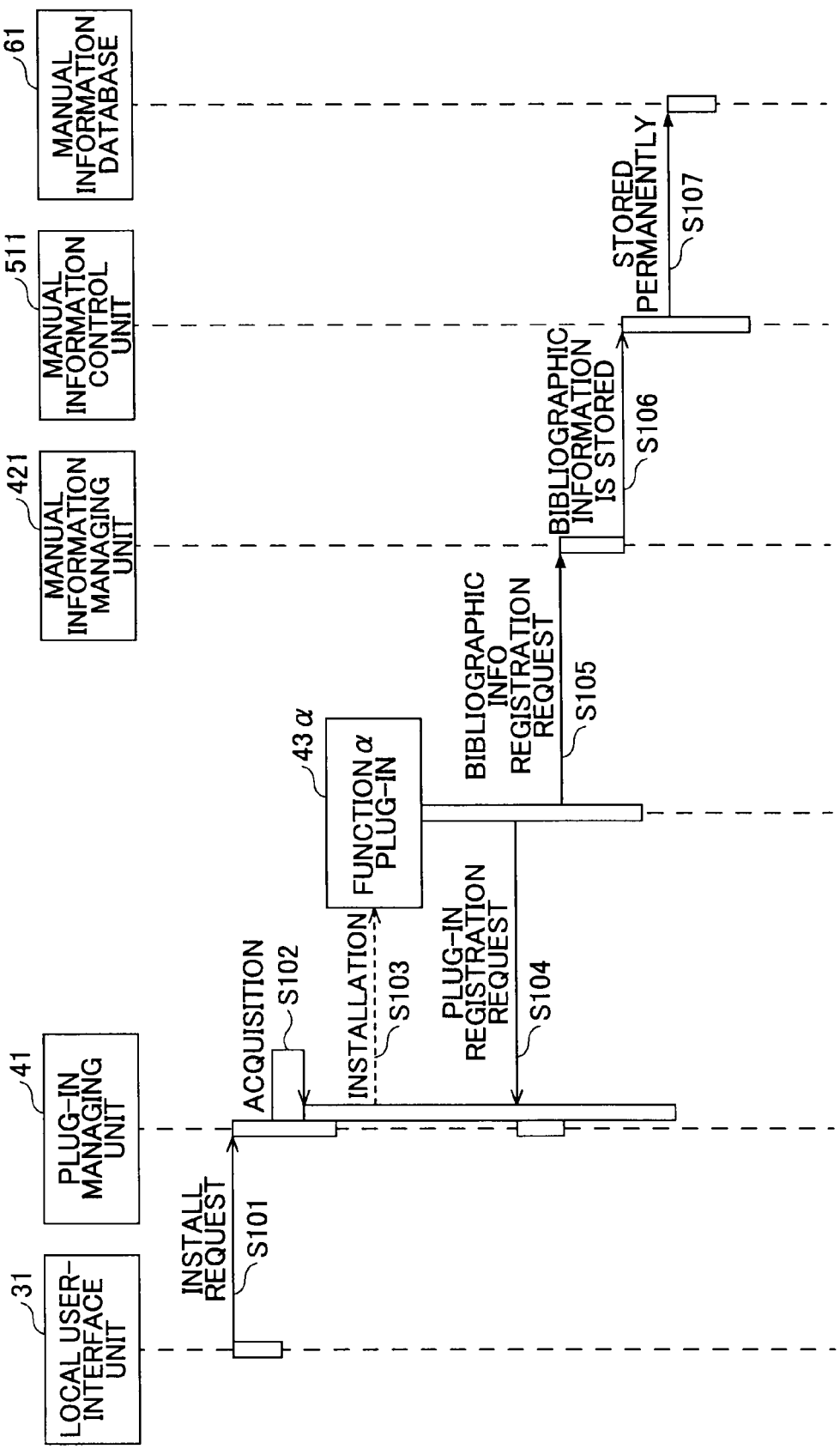
FIG. 4 is a sequence diagram for explaining the procedure of the information processing device in a first embodiment of the invention when a function plug-in is installed.

FIG. 4 is a sequence diagram for explaining the procedure of the information processing device in the first embodiment when a function plug-in is installed. In the procedure of FIG. 4, a function α plug-in 43α which is a function executing plug-in 43 which provides the function α is installed.

For example, when an installation request of the function α plug-in 43α is inputted by the user on the screen displayed on the operation panel 202 of the multi-function peripheral 1, the local UI unit 31 notifies the plug-in managing unit 41 of the installation request with the identifier of the function α plug-in 43α (S101).

In response to the request, the plug-in managing unit 41 acquires the function α plug-in 43α (S102), and performs installation of the function α plug-in 43α (S103).

Acquisition of the function α plug-in 43α may be performed by downloading of the plug-in from a predetermined computer through a network, or may be performed using a recording medium (for example, a memory card 235 inserted in a memory card slot 234 of the multi-function peripheral 1 in FIG. 1).

After the installation is performed, the function α plug-in 43α requests the plug-in managing unit 41 to perform registration of the static attribute information of the function α plug-in 43α (S104). The plug-in managing unit 41 stores the attribute information of the function α plug-in 43α on the HDD 233, for example.

Next, the function α plug-in 43α sends a bibliographic information registering request to the manual information managing unit 421 (S105). This request is to perform registration of the bibliographic information (separate volume information and page information) of the electronic manual of the function α plug-in 43α to the multi-function peripheral 1.

The manual information managing unit 421 notifies the request to the manual information control unit 511 (S106).

In response to the received request, the manual information control unit 511 registers the bibliographic information of the function α plug-in 43α into the manual information database 61 and stores it permanently (S107).

FIG. 5 is a diagram showing the state of the manual information database after the installation of the function α plug-in.

As shown in FIG. 5, by the installation of the function α plug-in 43α, the separate volume information of the electronic manual of the function α plug-in 43α is added to the separate volume information table 611, and the page information of the electronic manual of the function α plug-in 43α is added to the page information table 612. The added records are indicated by the arrows in FIG. 5.

As is apparent from FIG. 5, according to the newly added records, a separate volume with its volume title "function α" and two chapters with page titles "function α" and "how to use" belonging to the separate volume are registered.

Next, the procedure of the information processing device in the first embodiment when the contents information (list information) of the electronic manual of the function plug-in 43 installed in the multi-function peripheral 1 is displayed will be explained.

Figure 7:
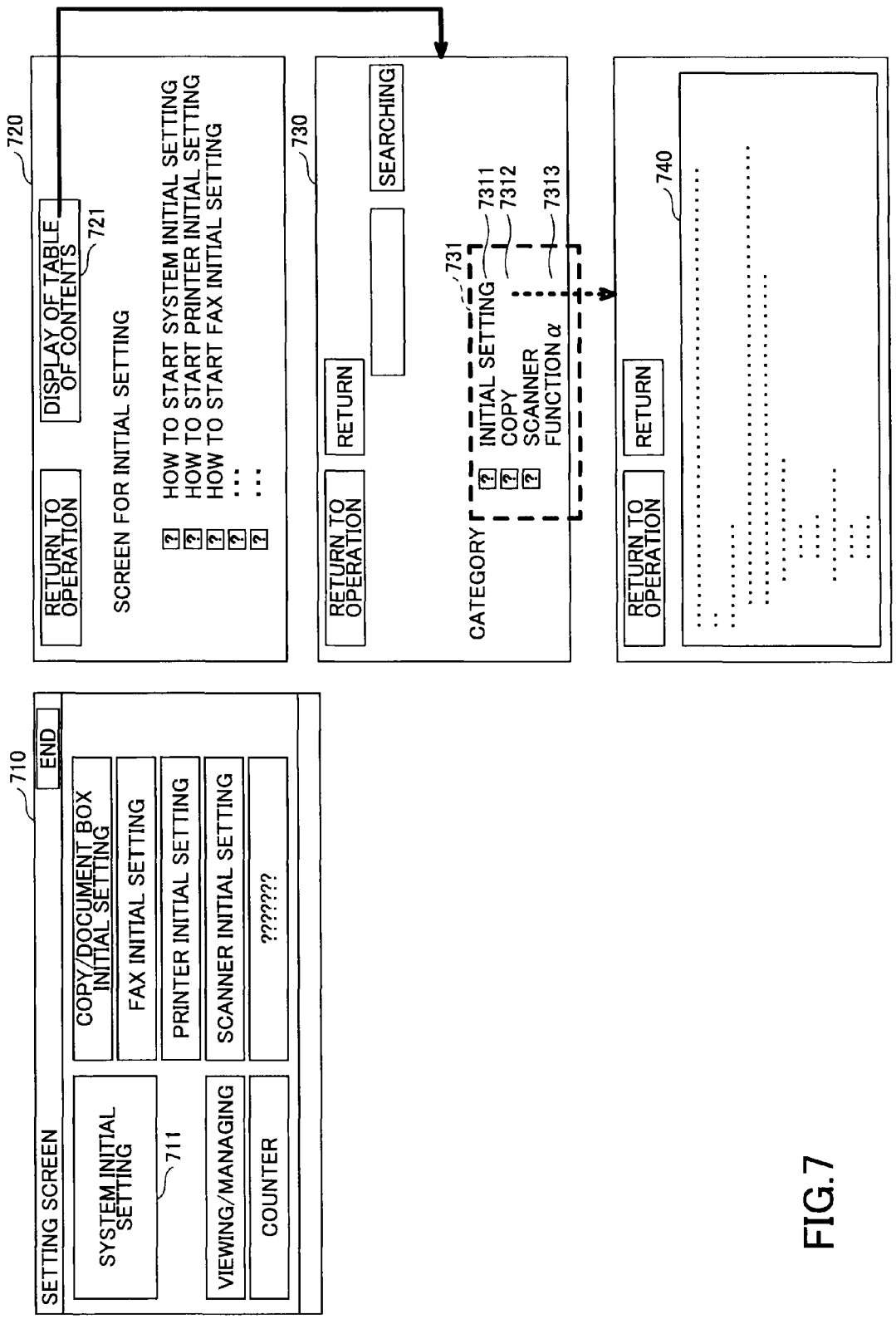
FIG. 7 is a diagram showing an example of the screen transition when the electronic manual is displayed.

FIG. 6 is a sequence diagram for explaining the procedure of the information processing device in the first embodiment when the contents information of the electronic manual is displayed. FIG. 7 shows an example of the screen transition when the electronic manual is displayed.

For example, when one of the buttons in a setting screen 710 (see FIG. 7) displayed on the operation panel 202 of the multi-function peripheral 1 is selected by the user, a manual screen corresponding to the selected button will be displayed.

Suppose that, in the example of FIG. 7, a system initial setting button 711 in the setting screen 710 was chosen, and then a system initial setting manual screen 720 was displayed. In the manual screen (or the system initial setting manual screen 720) being displayed, a table-of-contents displaying button 721 is arranged.

If the table-of-contents displaying button 721 is chosen, the local UI 31 sends a manual table-of-contents generating request to the manual table-of-contents generating unit 321 (S201). This request is to generate the table of contents of the electronic manual of the function plug-in 43.

The manual table-of-contents generating unit 321 requests the manual information managing unit 421 to perform acquisition of all the bibliographic information (separate volume information) registered in the separate volume information table 611 of the manual information database 61 (S202).

The manual information managing unit 421 notifies the request to the manual information control unit 511 (S203).

The manual information control unit 511 acquires all the separate volume information registered in the separate volume information table 611 of the manual information database 61 (S204). After the acquisition is completed, the manual information control unit 511 notifies the manual information managing unit 421 of the acquisition result (list of separate volume information) (S205).

After the list of separate volume information is received, the manual information managing unit 421 notifies the manual table-of-contents generating unit 321 that acquisition of separate volume information was completed (S206).

In response to the notice from the manual information managing unit 421, the manual table-of-contents generating unit 321 acquires the list of separate volume information from the manual information managing unit 421 (S207).

Subsequently, the manual table-of-contents generating unit 321 generates the information for displaying the list of the separate volume titles contained in the separate volume information (for example, display data, such as HTML data, which is called "table-of-contents information") (S208).

At this time, a link between separate volume title and URL contained in the corresponding separate volume information is established.

Subsequently, the manual table-of-contents generating unit 321 outputs the generated table-of-contents information to the local UI unit 31 (S209). The local UI unit 31 displays the table of contents on the operation panel 202 based on the received table-of-contents information.

As shown in FIG. 7, a table-of-contents screen 730 is equivalent to the screen displayed based on the table-of-contents information. In the table-of-contents screen 730, a list of separate volume titles of respective electronic manuals is displayed as table-of-contents information 731. In the table-of-contents information 731, a table-of-contents item 7313 "function α" is an item which is newly displayed according to the installation of the function α plug-in 43α. On the other hand, a table-of-contents item 7311 is a table-of-contents item corresponding to the default electronic manual which is always displayed regardless of the installation of a function plug-in 43.

For example, if a table-of-contents item 7312 in the table-of-contents information 731 is selected by the user, a manual content 740 of the electronic manual of a corresponding volume based on the URL linked to the table-of-contents item 7312 is displayed.

Thus, after the addition of a plug-in is performed, the title of the electronic manual of the function provided by the plug-in is automatically added to the table-of-contents screen 730, and the user can easily refer to the newly added electronic manual of the plug-in.

There is a possibility that the appearance that electronic manuals are individually managed for respective application programs (in this embodiment, for the respective function plug-in modules) gives an unnatural impression to a user of electronic equipment whose use is restricted like an image forming device, apart from a general-purpose computer, such as a PC (personal computer). This is because the user is likely to have a feeling of using the image forming device itself rather than a feeling of using the application program of the image forming device. For this reason, the multi-function peripheral 1 in this embodiment is arranged so that the user can easily refer to the table-of-contents information of the electronic manual of each function plug-in 43 being installed, and further the table-of-contents information can be changed in response to the addition of a new function plug-in 43 to the multi-function peripheral 1. Thus, the multi-function peripheral 1 in this embodiment can raise the convenience of the user not only in using the electronic manuals but also in using the multi-function peripheral 1.

Moreover, it is not necessary to create a new table-of-contents screen 730 following the addition of a new electronic manual, and it is possible for the multi-function peripheral 1 in this embodiment to reduce the work burden on the person who creates electronic manuals.

In the above embodiment, the table-of-contents information is generated based on the separate volume information. However, generation of the table-of-contents information may be appropriately based on any hierarchy in the hierarchic structure of the contents of the electronic manuals.

Alternatively, the table-of-contents information may be generated based on the page information in the above embodiment. In such alternative case, a table of contents corresponding to the respective chapters is displayed as a set of table-of-contents items.

The sequence of displaying the table-of-contents items in the table-of-contents information 731 may be sorted in accordance with the display priority or the date of addition in the bibliographic information. Or, each time the function plug-in 43 as the owner is used, it is recorded as log information, and the sequence of displaying the table-of-contents items may be sorted in accordance with the frequency of using the function plug-in 43 based on the log information.

The sorting based on the display priority enables the sequence of displaying the table-of-contents items to be in accordance with the intention of the person who creates electronic manuals. Moreover, the sorting based on the date of addition enables the user to easily refer to the electronic manual of a newly added function. Further, the sorting based on the use frequency enables the user to easily refer to the electronic manual of the function with the higher use frequency.

Alternatively, the multi-function peripheral 1 may be arranged to allow the user to select one of the criteria (the display priority, the date of addition, or the use frequency) on which the sorting is based.

Next, the procedure of the information processing device in the first embodiment when the function plug-in 43 installed in the multi-function peripheral 1 is uninstalled will be explained.

Figure 8:
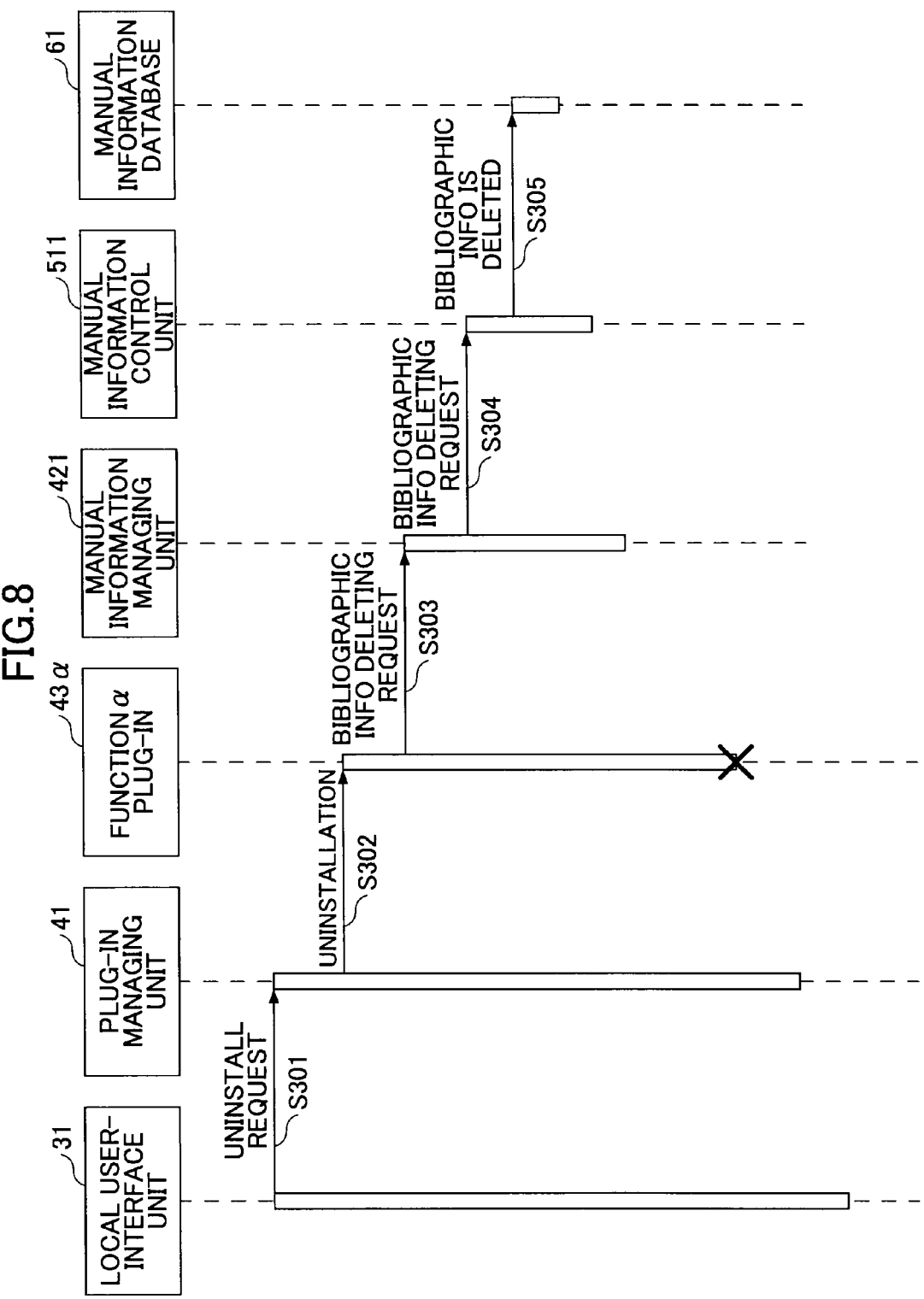
FIG. 8 is a sequence diagram for explaining the procedure of the information processing device in the first embodiment when the function plug-in is uninstalled.

FIG. 8 is a sequence diagram for explaining the procedure of the information processing device in the first embodiment when the function plug-in is uninstalled. Suppose that, in the procedure of FIG. 8, the function α plug-in 43α is uninstalled.

For example, when an uninstallation request of the function α plug-in 43α is inputted by the user on the screen displayed on the operation panel 202 of the multi-function peripheral 1, the local UI unit 31 notifies the plug-in managing unit 41 of the uninstallation request together with the identifier of the function α plug-in 43α (S301). The plug-in managing unit 41 requests uninstallation of the function α plug-in 43α (S302).

In response to the request, the function α plug-in 43α requests the manual information managing unit 421 to delete the bibliographic information of the electronic manual of the function α plug-in 43α by using the identifier of the function α plug-in 43 α as a key (S303).

The manual information managing unit 421 notifies the deletion request to the manual information control unit 511 (S304).

In response to the request, the manual information control unit 511 deletes the bibliographic information of the function α plug-in 43α in the manual information database 61 (S305).

Specifically, the separate volume information whose owner name corresponds to the identifier of the function α plug-in 43α is deleted in the separate volume information table 611, and the page information whose owner name corresponds to the identifier of the function α plug-in 43α is deleted in the page information table 612.

Thereby, the manual information database 61 changes from the state of FIG. 5 to the state of FIG. 3. Subsequently, the substance of the function α plug-in 43α is also deleted.

In this manner, when the function plug-in 43 is uninstalled, the bibliographic information of the electronic manual of the function plug-in 43 is also deleted in the manual information database 61. Therefore, even if the procedure of FIG. 6 is performed after the procedure of FIG. 8 is completed, the table-of-contents items regarding the function α will not be displayed in the table-of-contents information 731 of the table-of-contents screen 730 (FIG. 7).

In the above-described first embodiment, the logic which performs a function (the function executing unit 431) and the electronic manual of the function (the manual content 432) are contained in a single function plug-in 43 as shown in FIG. 2.

However, it is not necessary that the function executing unit 431 and the manual content 432 be contained in a single function plug-in. Alternatively, the function executing unit 431 and the manual content 432 may be contained in different function plug-in modules respectively.

Figure 9:
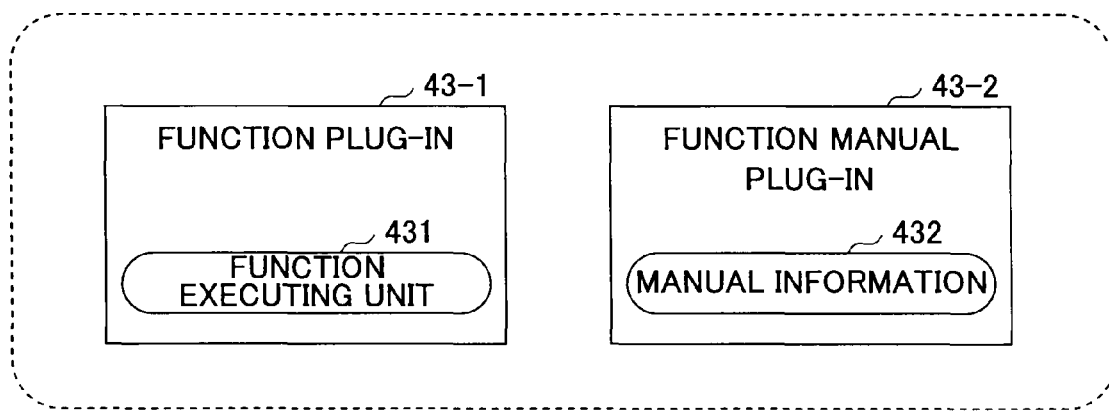
FIG. 9 is a diagram showing the composition of a function plug-in in a second embodiment of the invention.

FIG. 9 shows the composition of a function plug-in in a second embodiment of the invention.

As shown in FIG. 9, a function executing unit 431 is contained in a function plug-in 43-1 in the second mounting and any manual content 432 is not contained therein. A manual content 432 is contained in a function manual plug-in 43-2 which is a plug-in separated from the function plug-in 43-1.

Next, the procedure of the multi-function peripheral 1 in the second embodiment will be explained. In the second embodiment, the procedures at the time of installation of a plug-in and at the time of displaying the table-of-contents information of an electronic manual are essentially the same as those corresponding procedures in the first embodiment, and a description thereof will be omitted.

However, in the second embodiment, the electronic manual of the function is newly added to the multi-function peripheral 1 by installation of the function manual plug-in 43-2, registration of the bibliographic information to the manual information database 61 is performed at the time of installation of the function manual plug-in 43-2, and registration of the bibliographic information to the manual information database 61 is not performed at the time of installation of the function plug-in 43-1.

Figure 10:
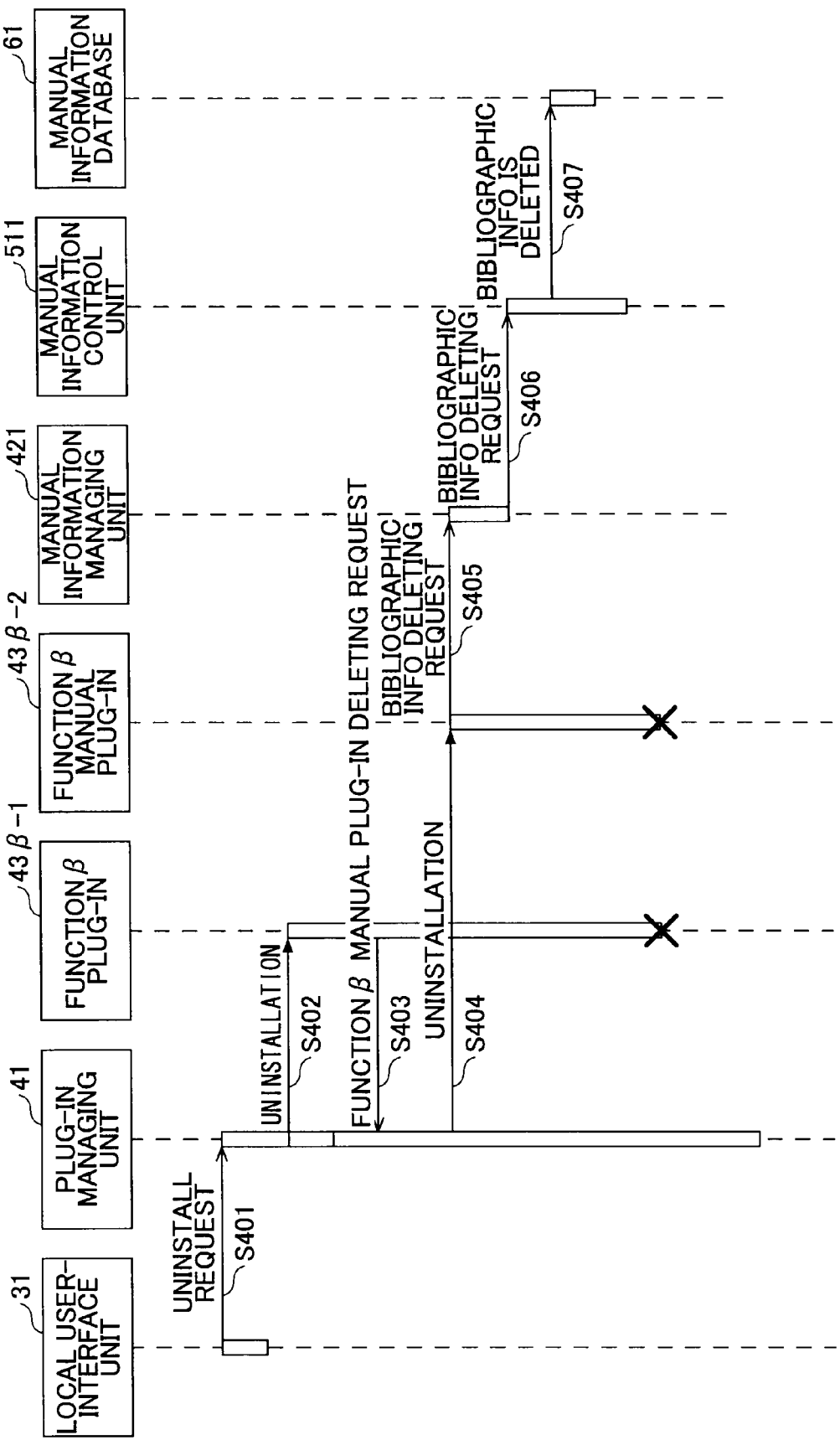
FIG. 10 is a sequence diagram for explaining the procedure of the information processing device in the second embodiment when the function plug-in is uninstalled.

FIG. 10 is a sequence diagram for explaining the procedure of the information processing device in the second embodiment when the function plug-in is uninstalled. Suppose that, in the procedure of FIG. 10, the function β plug-in 43β-1 is uninstalled.

For example, when an uninstallation request of the function β plug-in 43β-1 is inputted by the user on the screen displayed on the operation panel 202 of the multi-function peripheral 1, the local UI unit 31 notifies the plug-in managing unit 41 of the uninstallation request together with the identifier of the function β plug-in 43β-1 (S401). The plug-in managing unit 41 requests uninstallation of the function β plug-in 43β-1 (S402).

In response to the request, the function β plug-in 43β-1 requests the plug-in managing unit 41 to uninstall the function β manual plug-in 43β-2 which is a plug-in holding the electronic manual regarding the function of the function β plug-in 43 β-1 (S403), and subsequently the function β plug-in 43β-1 is uninstalled.

In response to the request from the function β plug-in 43β-1, the plug-in managing unit 41 requests uninstallation of the function β manual plug-in 43β-2 (S404).

In response to the request, the function β manual plug-in 43β-2 requests the manual information managing unit 421 to delete the bibliographic information of the electronic manual of the function β manual plug-in 43β-2 by using the identifier of the function β manual plug-in 43β-2 as a key (S405).

The manual information managing unit 421 notifies the request to the manual information control unit 511 (S406).

In response to the request, the manual information control unit 511 deletes the bibliographic information of the function β manual plug-in 43β-2 in the manual information database 61 (S407).

Specifically, the separate volume information whose owner name corresponds to the identifier of the function β manual plug-in 43β-2 is deleted in the separate volume information table 611, and the page information whose owner name corresponds to the identifier of the function β manual plug-in 43 β-2 is deleted in the page information table 612. Subsequently, the substance of the function β manual plug-in 43β-2 is also deleted.

If a plug-in of the logic of a function and another plug-in of an electronic manual of the function are mounted separately as in the second embodiment, the task of replacing only the electronic manual becomes easier than in the case of the first embodiment.

Next, an electronic manual replacing procedure will be explained.

Figure 11:
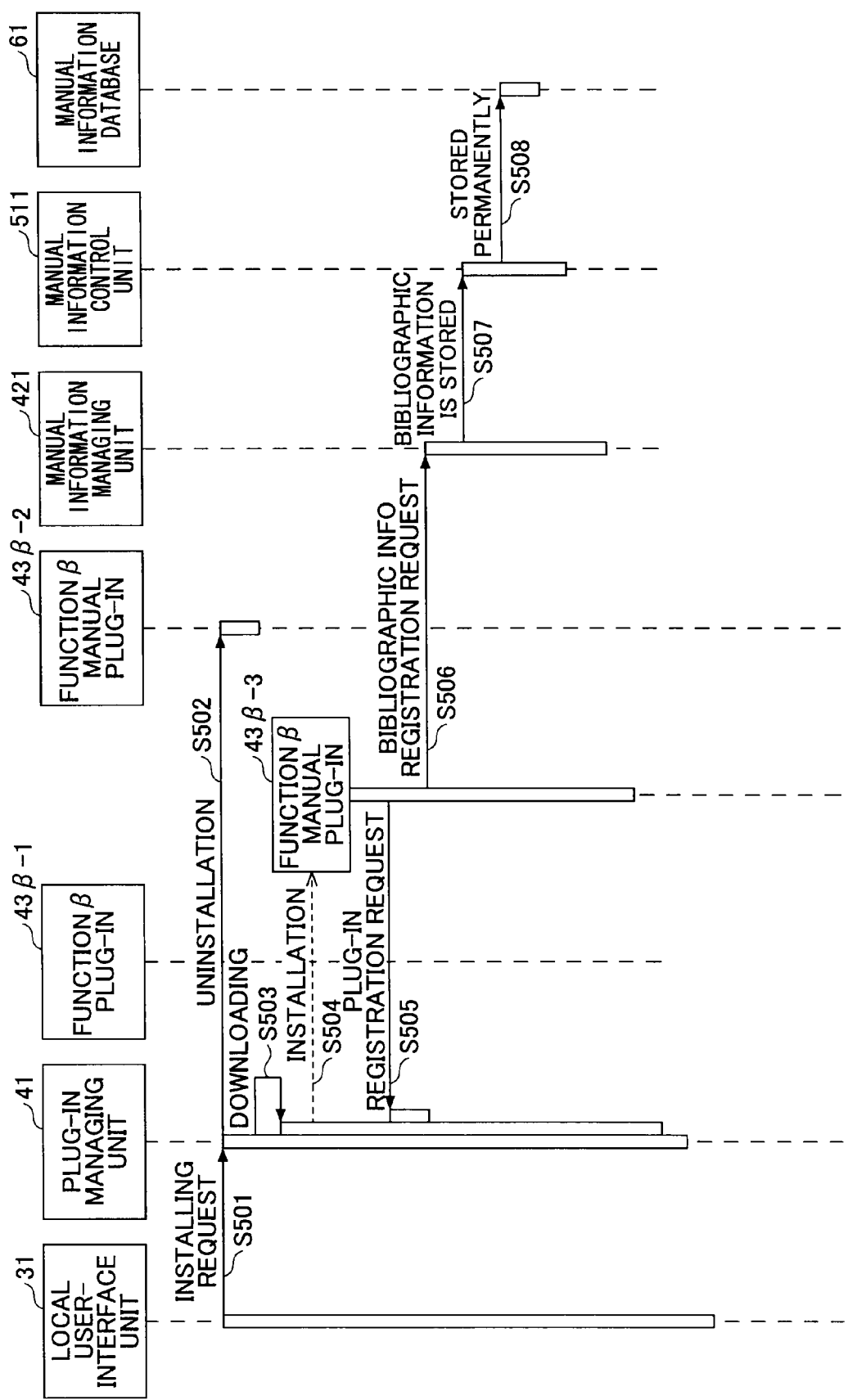
FIG. 11 is a sequence diagram for explaining the procedure of the information processing device in the second embodiment when the electronic manual is replaced.

FIG. 11 is a sequence diagram for explaining the procedure of the information processing device in the second embodiment when the electronic manual is replaced. Suppose that, in the procedure of FIG. 11, in the state where the function β manual plug-in 43 β-2 is already installed as the plug-in holding the electronic manual of the function β, the electronic manual of the function β is replaced.

For example, when a request for replacing the function βmanual plug-in 43β-2 (the existing electronic manual) by the function β manual plug-in 43β-3 (a new electronic manual) is inputted by the user on the screen displayed on the operation panel 202 of the multi-function peripheral 1, the local UI unit 31 notifies the plug-in managing unit 41 of an installation request of the function β manual plug-in 43β-3 together with the identifier of the function β manual plug-in 43β-3 (S501).

In response to the installation request, the plug-in managing unit 41 requests uninstallation of the function β manual plug-in 43β-2 (S502). Subsequently, in this case, the steps which are performed in response to the uninstallation request are the same as corresponding steps S405-S407 in FIG. 10, and a description thereof will be omitted.

After the uninstallation of the function β manual plug-in 43β-2 is completed, the plug-in managing unit 41 acquires the function β manual plug-in 43β-3 by downloading (S503), and performs the installation thereof (S504).

The acquisition of the function β manual plug-in 43β-3 may be performed by the downloading from a predetermined computer through a network, or may be performed using a recording medium (for example, a memory card 235 placed into the memory card slot 234 in the multi-function peripheral 1).

After the installation is completed, the function β manual plug-in 43β-3 requests the plug-in managing unit 41 to register the static attribute information of the function β manual plug-in 43β-3 (S505). The plug-in managing unit 41 stores the attribute information of the function β manual plug-in 43β-3 on the HDD 233, for example.

Subsequently, the function β manual plug-in 43β-3 sends a bibliographic information registering request to the manual information managing unit 421 (S506). This request is to request the registration of the bibliographic information (separate volume information and page information) of the electronic manual of the function β manual plug-in 43β-3 to the multi-function peripheral 1.

The manual information managing unit 421 notifies the request to the manual information control unit 511 (S507).

The manual information control unit 511 registers the bibliographic information of the function β manual plug-in 43β-3 into the manual information database 61, and stores it permanently (S508). Thereby, the replacement of the electronic manual is completed.

Thus, performing the function manual plug-in replacing procedure makes it possible to easily maintain the contents of the electronic manual in the newest state. Because the unnecessary electronic manual may be deleted, it is possible to prevent the storage region of the HDD from being consumed excessively.

Next, a third embodiment of the invention in which multilingual measures regarding the language of the electronic manual are taken will be explained. In the third embodiment, new component modules (plug-in) other than in the first embodiment are added to the user-interface layer 30.

Figure 12:
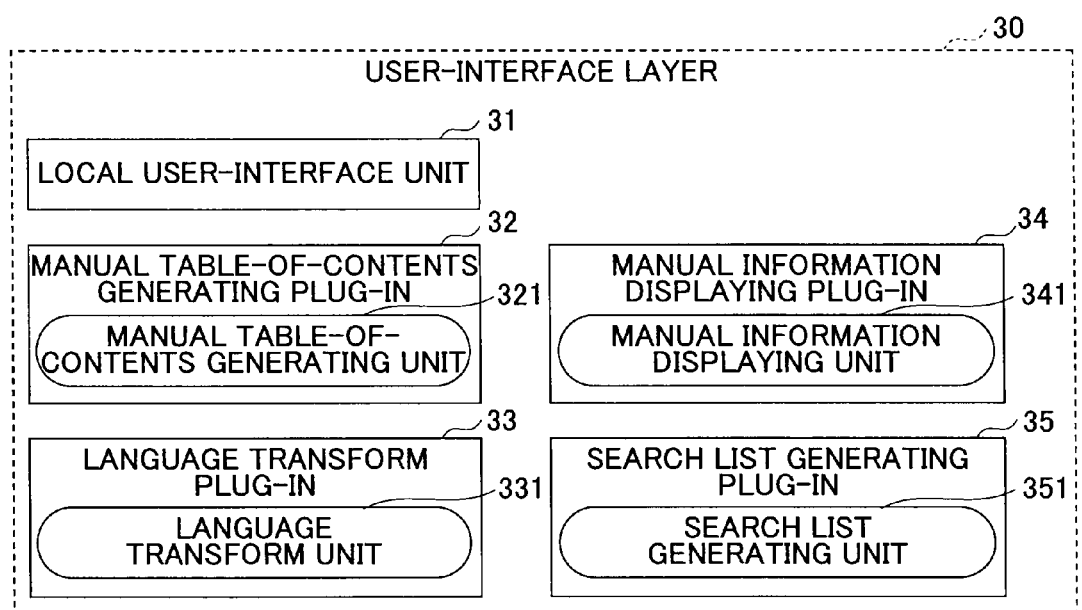
FIG. 12 is a diagram showing the composition of a user-interface layer in a third embodiment of the invention.

FIG. 12 shows the composition of a user-interface layer in the third embodiment. In FIG. 12, the elements which are the same as corresponding elements in FIG. 2 are designated by the same reference numerals, and a description thereof will be omitted.

As shown in FIG. 12, the user-interface layer 30 in the third embodiment further includes a language transform plug-in 33, a manual information displaying plug-in 34, and a search list generating plug-in 35, in addition to the plug-in modules 31 and 32 of the user-interface layer 30 in the first embodiment.

The language transform plug-in 33 has a language transform unit 331. The language transform unit 331 performs language transform processing for displaying the character strings of an electronic manual in a predetermined language (natural language).

The manual information displaying plug-in 34 has a manual information displaying unit 341. The manual information displaying unit 341 controls display processing of the contents of an electronic manual (or the contents of respective chapters).

The search list generating plug-in 35 has a search list generating unit 351. The search list generating unit 351 controls the keyword searching of the contents of each of the respective chapters of an electronic manual being performed in response to the input of a search keyword, and generates a list of the contents (chapters) containing the search keyword.

In the third embodiment, with respect to the character strings of the volume titles of the separate volume information table 611 and the character strings of the page titles and volume titles of the page information table 612 whose display mode (display format) varies depending on the language, the identifiers that identify those character strings ("character string IDs") are registered rather than registering the character strings in a specific language.

Next, the procedure of the multi-function peripheral 1 in the third embodiment will be explained.

Figure 13:
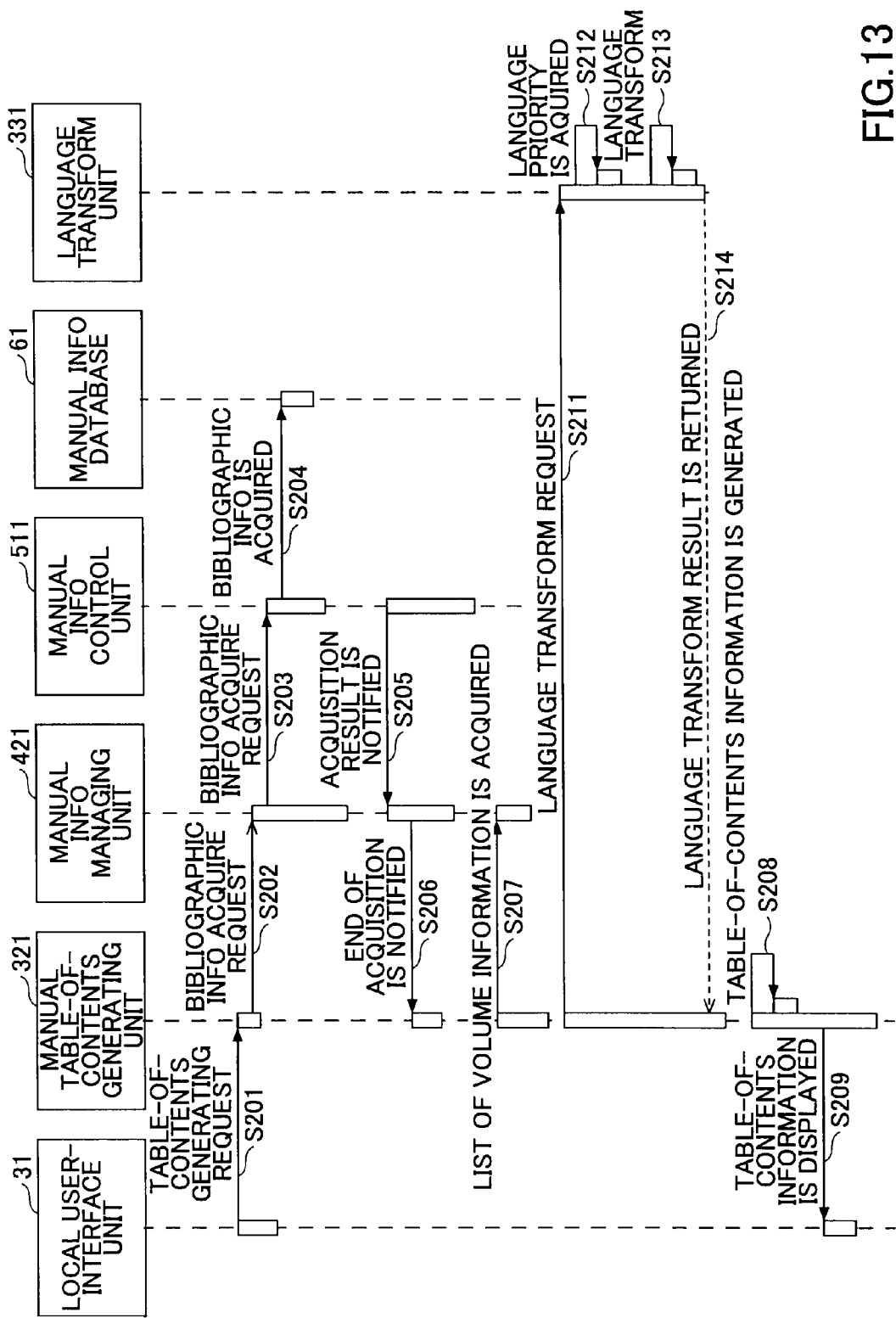
FIG. 13 is a sequence diagram for explaining the procedure of the information processing device in the third embodiment when the contents information of the electronic manual is displayed.

FIG. 13 is a sequence diagram for explaining the procedure of the information processing device in the third embodiment when the contents information of the electronic manual is displayed.

In the procedure of FIG. 13, the steps which are the same as corresponding steps in the procedure of FIG. 6 are designated by the same reference numerals, and a description thereof will be omitted.

In the procedure of FIG. 13 of the third embodiment, an additional procedure of steps S211-S214 is performed between step S207 and step S208.

Namely, after the list of separate volume information is acquired at the step S207, the manual table-of-contents generating unit 321 outputs the list of the volume titles contained in the separate volume information to the language transform unit 331, and requests the language transform of each volume title in a predetermined language (S211). The list of volume titles transferred in this case is a list of character string IDs, not a list of character strings in a specific language.

In response to the request, the language transform unit 331 acquires the setting value of the language priority (S212). The language priority is a priority which is set up for every language as a selection criterion of the language for displaying the contents of the electronic manual. For example, the setting value of the language priority is beforehand inputted through the operation panel 202 and stored on the HDD 233.

Subsequently, the language transform unit 331 reads character strings identified by the character string IDs from a language file, and transforms each character string into a character string in the language with the highest priority contained in the language priority (S213).

The language file used in the step S213 is, for example, a file in which the character string corresponding to each character string ID is defined beforehand in respective languages, and this file is stored on the HDD 233.

Subsequently, the language transform unit 331 returns a language transform result (a list of the volume titles whose character strings are expressed in the language with the highest priority of the language priority) to the manual table-of-contents generating unit 321 (S214).

Therefore, the table-of-contents information whose character strings are expressed in the language with the highest priority of the language priority is generated at the manual table-of-contents generating unit 321 (S208), and it is displayed on the operation panel 202 of the multi-function peripheral 1 (S209).

In the above-described embodiment, the table-of-contents information is generated based on the separate volume information. Alternatively, when generating the table-of-contents information based on the page information, the same procedure may also be performed. In such a case, the table of contents in which the titles of respective chapters whose character strings are expressed in the language with the highest priority of the language priority will be displayed.

The procedure of FIG. 13 is also applicable to either the composition of the first embodiment in which the function executing unit 431 and the manual content 432 are contained in a single plug-in module (the function plug-in 43) or the composition of the second embodiment in which the function executing unit 431 and the manual content 432 are contained in different plug-in modules (refer to FIG. 9).

Next, the procedure of the multilingual measures at the time of displaying the text of an electronic manual will be explained.

Figure 14:
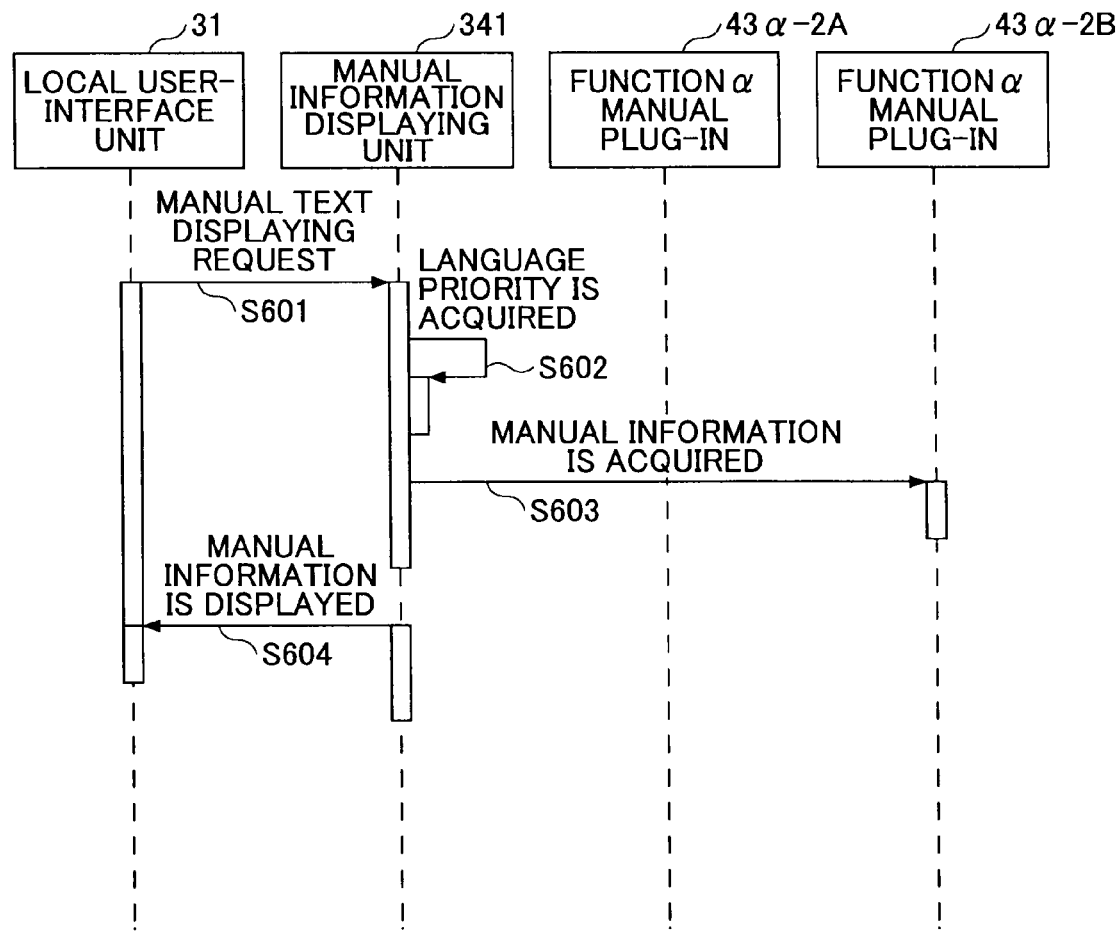
FIG. 14 is a sequence diagram for explaining the procedure of the information processing device in the third embodiment when the text of the electronic manual is displayed.

FIG. 14 is a sequence diagram for explaining the procedure of the information processing device in the third embodiment when the text of the electronic manual is displayed.

In performing the procedure of FIG. 14, use of the composition of the second embodiment in which the function executing unit 431 and the manual content 432 are contained in different plug-in modules (FIG. 9) is more efficient. The use of this composition enables a plurality of manual contents 432 expressed in different languages respectively to be arranged for the same function executing unit 431.

Suppose that a function α manual plug-in 43 α-2A containing the manual content 432 of the function α expressed in a language A (for example, Japanese) and a function α manual plug-in 43α-2B containing the manual content 432 of the function α expressed in a language B (for example, English) are provided in FIG. 14.

For example, when one of chapters is chosen by the user in the state where the table-of-contents information as a list of the chapter titles is displayed on the operation panel 202, the local UI unit 31 requests the manual information displaying unit 341 to display the text of the selected chapter (S601). In transmitting this request, the link associated with the selected chapter (or the link established based on the URL in the page information table 612) is also notified to the manual information displaying unit 341.

In response to the request, the manual information displaying unit 341 acquires the setting value of the language priority (S602). Subsequently, the manual information displaying unit 341 acquires a manual content 432 from the manual plug-in 43-2 corresponding to the highest language of the language priority (S603).

Suppose that in the example of FIG. 14, the language with the highest priority is the language B. Then, the manual content 432 of the function α manual plug-in 43α-2B is acquired in the step S603.

Identification of the manual content 432 being acquired is performed based on the URL of the link associated with the selected chapter or the stored file name (refer to FIG. 3) with respect to the selected chapter.

At this time, the URL or the stored file name is transformed in accordance with the management system (storage system) of the manual content 432 on the basis of language. For example, when the management system is arranged such that different URLs are used for respective languages (for example, a specific character string (jp, en, etc.) indicating the classification of language is affixed to the end of each URL), the manual information displaying unit 341 converts the URL into a character string in the language with the highest priority of the language priority.

Or, when the management system is arranged such that different stored file names are used for respective languages (for example, the character string which shows the classification of language is affixed to the end of the stored file name), the manual information displaying unit 341 converts the stored file name into a character string in the language with the highest priority of the language priority.

The manual content 432 which is identified based on the URL or the stored file name after the conversion was performed is an object of acquisition. Then, the manual information displaying unit 341 outputs the acquired manual content 432 to the local UI unit 31 (S604). The local UI unit 31 displays the manual content 432 on the operation panel 202.

Therefore, the text in the language with the highest priority of the language priority is displayed. For example, when the manual content 432 corresponding to the language with the highest priority of the language priority cannot be acquired in the step S603 (or when the manual content 432 does not exist), the manual information displaying unit 341 acquires the manual content 432 corresponding to the language with a next highest priority of the language priority.

Next, the multilingual measure in the case of the keyword searching of an electronic manual will be explained.

Figure 15:
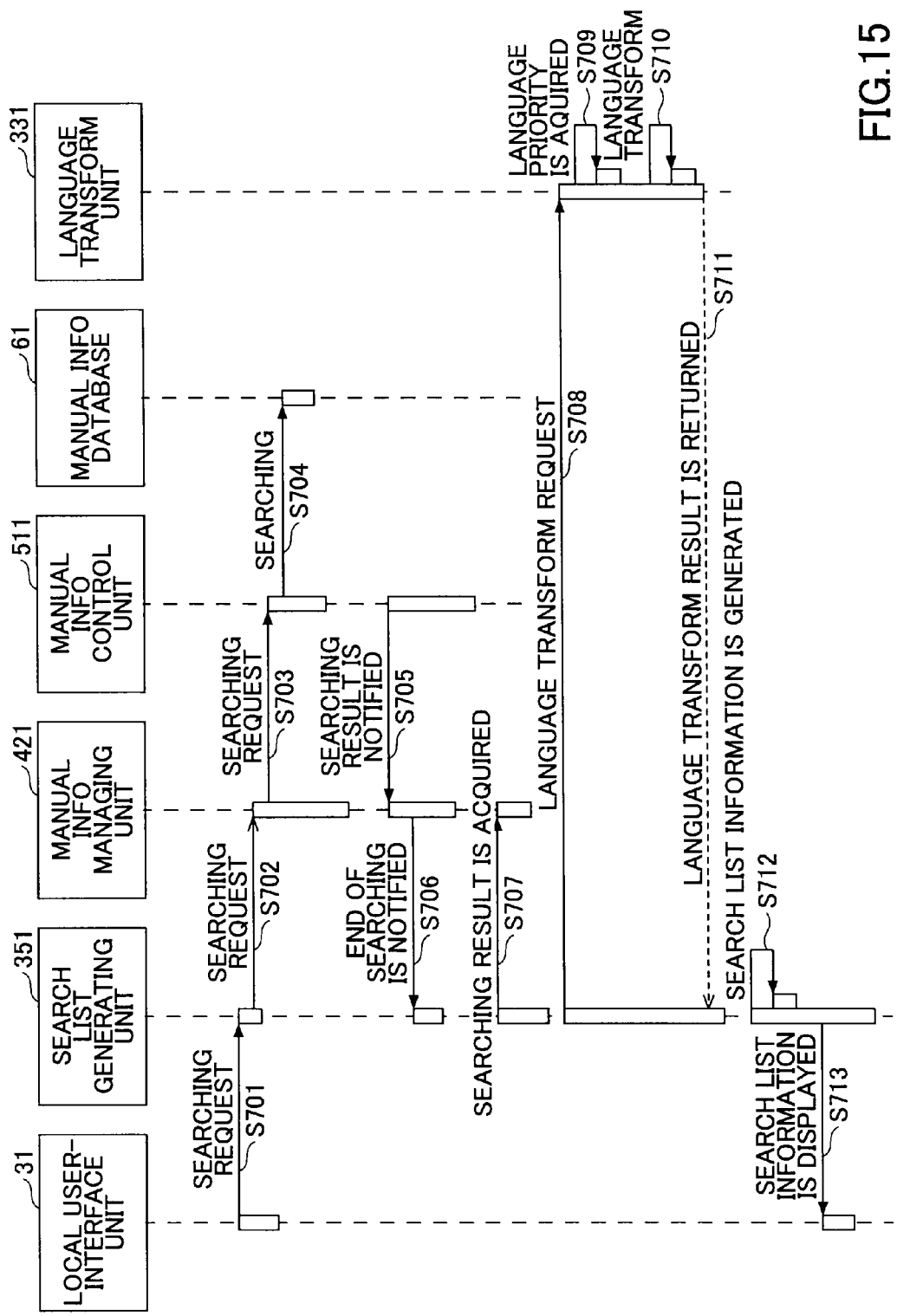
FIG. 15 is a sequence diagram for explaining the procedure of the keyword searching of the electronic manual in the third embodiment.

FIG. 15 is a sequence diagram for explaining the procedure of the keyword searching of the electronic manual in the third embodiment.

For example, when a search keyword to an electronic manual in a retrieval screen displayed on the operation panel 202 of the multi-function peripheral 1 is inputted by the user, the local UI 31 requests the search list generating unit 351 to perform searching of electronic manuals containing the search keyword (S701).

The searching request is notified to the manual information control unit 511 through the manual information managing unit 421 (S702, S703).

In response to the request, the manual information control unit 511 searches manual contents 432 containing the search keyword from among the files (the manual contents 432) storing all the chapters registered in the page information table 612 of the manual information database 61 (S704). Then, the manual information control unit 511 notifies the manual information managing unit 421 of a list of the page titles of the chapters of the searched manual contents 432 (the page titles identified by the character string IDs) as a search result (S705).

When the search result is received, the manual information managing unit 421 notifies the search list generating unit 351 that keyword searching is completed (S706).

In response to the notice from the manual information managing unit 421, the search list generating unit 351 acquires the search result from the manual information managing unit 421 (S707).

Subsequently, at steps S708-S711, the procedure that is the same as the procedure of the steps S211-S214 in FIG. 13 is performed with respect to the character string IDs contained in the search result. Therefore, the search result is converted from the character string IDs into the character strings expressed in the language with the highest priority of the language priority.

Subsequently, the search list generating unit 351 generates the contents (called "search list information") for displaying the converted search result (or the list of the page titles expressed in the language with the highest priority of the language priority) (S712). At this time, the links between the respective page titles and the URLs contained in the corresponding page information are established.

Subsequently, the search list generating unit 351 outputs the generated search list information to the local UI unit 31 (S713). The local UI unit 31 displays the search list information on the operation panel 202. Therefore, the list of the page titles expressed in the language with the highest priority of the language priority is displayed as the search result on the operation panel 202.

In the above-described embodiments, the input of the user and the displaying of the table-of-contents information of an electronic manual are performed using the operation panel 202. Alternatively, a PC (Personal Computer) connected with the multi-function peripheral 1 via a network may be used instead of the operation panel 202.

The present invention is not limited to the specifically disclosed embodiments, and variations and modifications may be made without departing from the scope of the present invention.

The present application is based on Japanese patent application No. 2007-221410, filed on Aug. 28, 2007, and Japanese patent application No. 2008-169493, filed on Jun. 27, 2008, the contents of which are incorporated herein by reference in their entirety.

What is claimed is:

1. An information processing device which is capable of adding a new program, comprising:
    a managing unit configured to manage bibliographic information of each of electronic manuals associated with respective programs installed in the information processing device;
    a registering unit configured to register, in response to addition of a new program, bibliographic information of an electronic manual associated with the new program, into the managing unit;
    a display data generating unit configured to generate display data indicating a list of the electronic manuals, based on the bibliographic information managed by the managing unit; and
    a displaying unit configured to display the list of the electronic manuals on a display device based on the display data,
    wherein the registering unit is further configured to generate a table-of-content item of the new program, which is additionally included in the list of the electronic manuals, according to installation of the new program in the information processing device, and the displaying unit displays the list of the electronic manuals including said table-of-contents item of the new program generated by the registering unit.

2. The information processing device according to claim 1, wherein the displaying unit is configured to display a list of titles of the electronic manuals contained in the bibliographic information.

3. The information processing device according to claim 1, wherein the displaying unit is configured to acquire, in response to selection of an electronic manual among the electronic manuals in the list, display data of the selected electronic manual based on position information of the display data contained in the bibliographic information, so that the display data is displayed.

4. The information processing device according to claim 1, further comprising a deleting unit configured to delete, in response to deletion of a program, bibliographic information of an electronic manual, associated with the program being deleted, in the managing unit.

5. The information processing device according to claim 4, wherein, in response to a replacing request of an existing electronic manual associated with a program, the deleting unit is configured to delete bibliographic information of the existing electronic manual, and the registering unit is configured to register bibliographic information of a new electronic manual.

6. The information processing device according to claim 1, wherein the managing unit is configured to manage the bibliographic information according to a hierarchic structure of the contents of the electronic manuals, and the display data generating unit is configured to generate the display data based on bibliographic information of a predetermined hierarchy in the hierarchic structure.

7. The information processing device according to claim 1, wherein the bibliographic information contains a display priority indicating a sequence of displaying the electronic manuals in the list, and the display data generating unit is configured to generate the display data based on the display priority.

8. The information processing device according to claim 1, wherein the bibliographic information contains a date of addition indicating a date the bibliographic information is registered in the managing unit, and the display data generating unit is configured to determine a sequence of displaying the electronic manuals in the list based on the date of addition.

9. The information processing device according to claim 1, wherein the display data generating unit is configured to determine a sequence of displaying the electronic manuals in the list based on a use frequency of each of the respective programs according to log information which is recorded each time a corresponding one of the programs is used.

10. An electronic manual managing method for use in an information processing device which is capable of adding a new program, the information processing device including a managing unit configured to manage bibliographic information of each of electronic manuals associated with respective programs installed in the information processing device, the electronic manual managing method comprising:
    a registering step of registering, in response to addition of a new program, bibliographic information of an electronic manual associated with the new program, into the managing unit;
    a display data generating step of generating display data indicating a list of the electronic manuals, based on the bibliographic information managed by the managing unit; and
    a displaying step of displaying the list of the electric manuals on a display device based on the display data, wherein the registering step further includes generating a table-of-content item of the new program, which is additionally included in the list of the electronic manuals, according to installation of the new program in the information processing device, and the displaying step further includes displaying the list of the electronic manuals including said table-of-contents item of the new program generated by the registering step.

11. The electronic manual managing method according to claim 10, wherein the display step is provided to display a list of titles of the electronic manuals contained in the bibliographic information.

12. The electronic manual managing method according to claim 10, wherein the display step is provided to acquire, in response to selection of an electronic manual among the electronic manuals in the list, display data of the selected electronic manual based on position information on the display data contained in the bibliographic information, so that the display data is displayed.

13. The electronic manual managing method according to claim 10, further comprising a deletion step of deleting, in response to deletion of a program, bibliographic information of an electronic manual, associated with the program being deleted, in the managing unit.

14. The electronic manual managing method according to claim 13, wherein, in response to a replacing request of an existing electronic manual related with a program, the deleting step is provided to delete bibliographic information of the existing electronic manual, and the registering step is provided to register bibliographic information of a new electronic manual.

15. The electronic manual managing method according to claim 10, wherein the managing unit is configured to manage the bibliographic information according to a hierarchic structure of the contents of the electronic manuals, and the display data generating step is provided to generate the display data based on bibliographic information of a predetermined hierarchy in the hierarchic structure.

16. The electronic manual managing method according to claim 10, wherein the bibliographic information contains a display priority indicating a sequence of displaying the electronic manuals in the list, and the display data generating step is provided to generate the display data based on the display priority.

17. The electronic manual managing method according to claim 10, wherein the bibliographic information contains a date of addition indicating a date the bibliographic information is registered in the managing unit, and the display data generating step is provided to determine a sequence of displaying the electronic manuals in the list based on the date of addition.

18. The electronic manual managing method according to claim 10, wherein the display data generating step is provided to determine a sequence of displaying the electronic manuals in the list based on a use frequency of each of the respective programs according to log information which is recorded each time a corresponding one of the programs is used.

19. A computer-readable recording medium storing computer-readable instructions thereon which, when executed by an information processing device, causes the information processing device to perform a method comprising:
registering, in response to addition of a new program, bibliographic information of an electronic manual associated with the new program, into the managing unit;
generating display data indicating a list of the electronic manuals, based on the bibliographic information managed by the managing unit; and
displaying the list of the electric manuals on a display device based on the display data,
wherein the registering further includes generating a table-of-content item of the new program, which is additionally included in the list of the electronic manuals, according to installation of the new program in the information processing device, and the displaying further includes displaying the list of the electronic manuals including said table-of-contents item of the new program generated by the registering.

* * * * *